April 12, 1932. C. B. COOK 1,853,335
APPARATUS FOR STERILIZING CONTAINERS
Filed Sept. 14, 1929
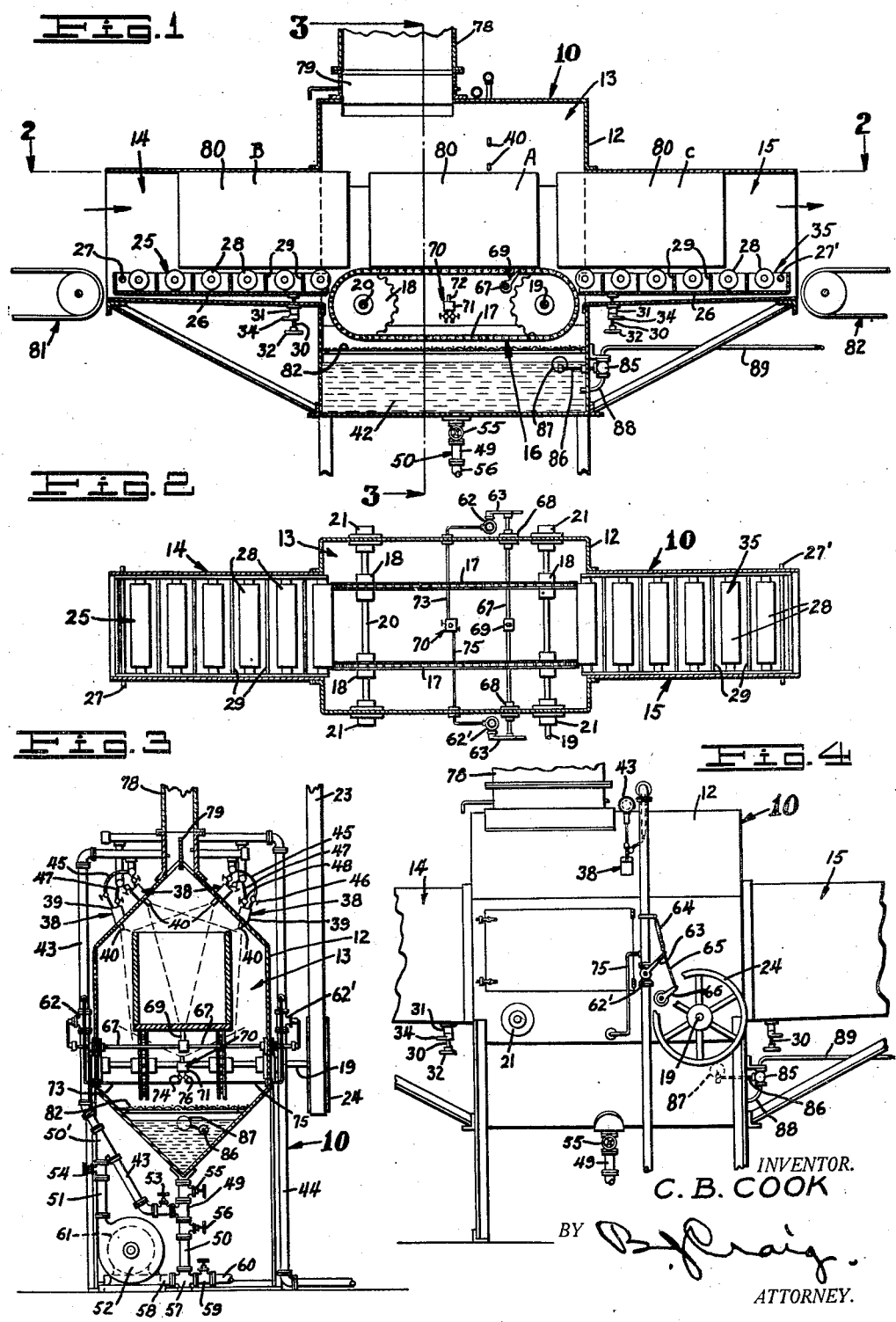
INVENTOR.
C. B. COOK
BY
ATTORNEY.

Patented Apr. 12, 1932

1,853,335

UNITED STATES PATENT OFFICE

CHARLES B. COOK, OF LOS ANGELES, CALIFORNIA

APPARATUS FOR STERILIZING CONTAINERS

Application filed September 14, 1929. Serial No. 392,720.

This invention relates to improvements in sterilizing devices.

The general object of the invention is to provide a device for spraying containers to render them sterile.

A specific object of the invention is to provide a spray device adapted to spray citrus fruit and other field boxes to exterminate animal life and fungi such as blue or green mold, thereon.

Another object of the invention is to provide an automatic machine particularly adapted for spraying containers.

A further object of the invention is to provide a device of the class described including a sterilizing chamber having an entrance and an exit and wherein a container to be sterilized acts as a closure for the entrance and a container that has been sterilized acts as a closure for the exit.

An additional object of my invention is to provide an improved method for sterilizing containers.

Other objects and the advantages of this invention will be apparent from the following description taken in connection with the accompanying drawings wherein:

Fig. 1 is a central longtudinal section through my improved device.

Fig. 2 is a section taken on line 2—2 of Fig. 1, with the boxes omitted.

Fig. 3 is a section taken on line 3—3 of Fig. 1, and

Fig. 4 is a fragmentary side view of the device.

Referring to the drawings by reference characters I have indicated my improved device generally at 10. As shown, this device includes a housing 12 which forms a spray chamber 13 having an entrance tunnel 14 leading thereinto and an exit tunnel 15 leading therefrom.

Within the chamber 13 I provide a conveyor mechanism which is indicated generally at 16 and includes a pair of spaced chains 17 supported on sprockets 18 which are secured to shafts 19 and 20 mounted in bearings 21 on the housing 12. Secured to the shaft 19 I provide a pulley 24 by which the conveyor mechanism may be driven through the medium of a belt 23 from any suitable source of power (see Figs. 3 and 4).

Within the entrance tunnel 14 I provide a roller conveyor which is indicated generally at 25 and includes a frame 26 having a bottom and side walls and is pivoted adjacent its outer end on a shaft 27. Rotatably supported on the frame 26 at spaced intervals I provide a plurality of rollers 28 and intermediate each roller I provide a transverse partition 29, the purpose of which will be described hereinafter.

The bottom of the conveyor frame 26 is supported in spaced relation to the bottom of the tunnel and adjacent the inner end of the tunnel I provide a threaded member 30 which is positioned in a threaded boss 31 on the bottom wall of the tunnel. The outer or lower end of the member 30 is provided with a hand wheel 32 and the inner or upper end of the member 30 is adapted to engage the bottom of the conveyor frame 26 to thereby support the inner end thereof. By turning the threaded member in either one direction or the other the inner end of the conveyor mechanism 25 will be tilted either up or down. To prevent accidental movement of the member 30 I provide a lock nut 34.

Within the exit tunnel 15 I provide a roller conveyor mechanism 35 which is similar in all respects to the roller conveyor mechanism 25 in the entrance tunnel 14 and is pivoted on a shaft 27'.

Positioned on the housing 13 I provide a plurality of overhead spray devices indicated generally at 38, each of which include a mixing valve 39 and a spray nozzle 40 which extends into the chamber 13. The mixing valves 39 may be of any of the air and liquid mixing valve types.

A liquid 42 is placed in the housing 12 and to convey this liquid to the spray devices 38 I provide a pipe line 43 and to convey compressed air or steam to the spray devices 38 I provide a pipe line 44. From the pipe line 43 to each of the mixing valves 39 I provide a conduit 45 having a shutoff valve 46 interposed therein and from the pipe line 44 to each of the mixing valves 39 I provide a conduit 47 having a shutoff valve 48 interposed therein.

The pipe line 43 is connected through the medium of a fitting 49 to a pipe line 50 which communicates with the interior of the housing 12. The pipe line 50 is further connected by a fitting 50' with a pipe line 51 which is connected to a pump 52. Interposed in the pipe line 43 between the fitting 49 and the fitting 50' I provide a control valve 53 and interposed in the pipe line 51 between the fitting 50' and the pump 52 I provide a control valve 54. Interposed in the pipe line 49 above the fitting 50' I provide a control valve 55 and below the fitting 50 a control valve 56. The lower end of the pipe line 50 is provided with a T-fitting 57 which is connected by a pipe 58 to the pump 52 and through the medium of a control valve 59 to a drain pipe 60.

The pump 52 is shown as adapted to be driven by an electric motor 61 but it will be understood that any other suitable means may be employed.

For controlling the passage of fluid through the pipe lines 43 and 44 I provide control valves 62 and 62' each of which includes an operating arm 63 which is adapted to be retained in a closed position by a coiled spring 64 as shown in Fig. 4. The arms 63 are connected by rods 65 to arms 66 secured to opposite ends of a shaft 67 which extends transversely of the housing 12 and is positioned in bearings 68 thereon.

Secured to the shaft 67 intermediate the length thereof I provide an arm 69 the upper end of which normally extends above the upper level of the working reach of the conveyor chains 17.

Positioned in the chamber 13 below the level of the working reach of the conveyor chain 17 I provide another spray device 70 which includes a mixing valve 71 and a nozzle 72. For supplying liquid to the device 70 I provide a conduit 73 which is connected to the pipe line 43 above the control valve 62 and includes a control valve 74 (Fig. 3) and for supplying fluid to the device 70 I provide a conduit 75 which is connected to the pipe line 44 above the control valve 62 and includes a control valve 76.

On the housing 12 I preferably provide a vent or stack 78 in which is positioned a damper 79.

In operation the articles or boxes 80 to be sprayed may be delivered to the device 10 by an endless belt conveyor as indicated at 81 and conveyed therefrom by an endless belt conveyor as indicated at 82 or in any other desired manner.

As a box 80 is fed into the device 10 it enters the entrance tunnel 14 and is pushed by the following box over the rollers 28 of the conveyors 25 onto the chains 17 of the conveyor 16 which preferably have a greater linear speed than the conveyor 81 to space the boxes on the chains 17. As the box travels along on the conveyor 16 it engages the arm 69 and swings it downward thereby rotating the shaft 67 and moving the arms 66 downward which in turn, through the medium of the rods 65, move the arms 63 downward against the action of the springs 64 and thereby operating the valves 62 to an open position, whereupon the spray devices 38 and 70 actuate to spray the box.

After the box has passed the arm 69 the springs 64 return the arms 63 to an upright position thereby operating the valves 62 to a closed position.

As the box that has just been sprayed continues along on the conveyor 16 it engages the preceding box on the conveyor 35 and pushes it out onto the conveyor 82 and itself remains on the conveyor 35 until pushed therefrom by the following box.

It will be understood that I may use a poisonous gas, for example, hydrocyanic gas, in my machine, instead of steam and air.

As shown in Fig. 1 the box 80 indicated at A is being sprayed while the box 80 indicated at B is in the entrance tunnel 14 and acts as a closure for the entrance to the chamber, and the box 80 indicated at C is in the exit tunnel 15 and acts as a closure for the exit from the chamber thereby confining the spray from the nozzles to the chamber 13.

The partitions 29 on the frames 26 in conjunction with the rollers 28 of the conveyors 25 and 35 also prevent the spray material from working out.

To prevent refuse from falling in the liquid 42 I preferably provide a screen 82. When it is desired to operate the spray devices by steam or air the valves 53 and 55 are opened and the valves 54 and 56 are closed and when it is desired to operate the sprays by liquid pressure the valves 48 on the steam and air conduits 47 of each mixing valve 38 and the valve 76 of the mixing valve 70 are closed. Furthermore the valves 54 and 55 are opened and the valves 53 closed whereupon on operation of the pump 52 the fluid 42 will be drawn from the housing 12 and forced through the spray devices 38 and 70.

The valve 59 remains closed at all times except when it is desired to drain the device, whereupon all the valves are opened.

I preferably provide an automatic liquid supply system which comprises a control valve 85 including a stem 86 which extends into the interior of the housing 12 where a float 87 is secured thereto. From the valve 85 to the interior of the housing I provide a pipe 88, and leading from the valve 85 to a suitable source of supply which is preferably positioned outside of the building in which the device 10 is located I provide a pipe line 89.

As the supply of the fluid 42 in the bottom of the chamber 13 diminishes the float 87 will lower and actuate the control valve 85 to an open position, whereupon fluid will flow into the chamber through the pipes 88 and 89 until the float 87 again rises and actuates the control valve 85 to a closed position.

The fluid 42 used in the device 10 is preferably distillate having a mixture of oil of citronella, oil of eucalyptus and creosote therein, all of which are effective in exterminating animal life and fungi such as blue or green mold.

From the foregoing description it will be apparent that I have provided a novel spray device which is simple in construction and efficient in use.

Having thus described my invention, I claim:

1. In a device of the class described, a housing, said housing including a chamber, an entrance tunnel communicating with said chamber, an exit tunnel communicating with said chamber, a conveyor mechanism in said chamber, a conveyor mechanism in said entrance tunnel and a conveyor mechanism in said exit tunnel, said chamber being adapted to contain a plurality of spray devices in said chamber, means to conduct said liquid from said chamber to said spray devices, means to conduct fluid to said spray devices, said fluid being adapted to cause passage of liquid from said chamber to said spray devices and force it therefrom, a valve associated with said fluid conduit, means to normally retain said valve in a closed position, means operable by an article on said conveyor in said chamber to actuate said valve to an open position to thereby cause said spray devices to operate to spray said article.

2. In a device of the class described, a housing, said housing including a chamber, a ventilating stack on said housing communicating with said chamber, an entrance tunnel communicating with said chamber, an exit tunnel communicating with said chamber, a conveyor mechanism in said chamber, said conveyor mechanism including a pair of spaced chains, said chains being supported on two sets of spaced sprockets, means to drive one set of said sprockets, a conveyor mechanism in said entrance tunnel and a conveyor mechanism in said exit tunnel, each of said last two conveyor mechanisms including a frame, said frame being pivotally supported adjacent its outer end and including a bottom and side walls, a plurality of rollers rotatably supported on said frame and a plurality of transverse partitions on said frame, said partitions being positioned between said rollers, a supporting member adjacent the inner end of said frame and means to raise or lower said supporting member whereby said frame may be moved about its pivotal support.

3. In a device of the class described, a housing, said housing including a chamber, an entrance tunnel communicating with said chamber, an exit tunnel communicating with said chamber, a conveyor mechanism in said chamber, means to drive said conveyor mechanism, a conveyor mechanism in said entrance tunnel and a conveyor mechanism in said exit tunnel, liquid in said chamber, a plurality of spray devices in said chamber, means to conduct said liquid from said chamber to said spray devices, a pump, means to operate said pump, said pump being adapted on operation thereof to draw said liquid from said chamber and force it to said spray devices, means to conduct fluid to said spray devices, said fluid being adapted to draw said liquid from said chamber to said spray devices and force it therefrom and means whereby either said pump or said fluid may be used to operate said spray devices, a valve associated with said liquid conduit, a valve associated with said fluid conduit, means to normally retain said valves in a closed position, means operable by an article on said conveyor in said chamber to actuate said valves to an open position to thereby cause said spray devices to operate to spray said article, said article when in said entrance tunnel being adapted to form a closure therefor and when in said exit tunnel being adapted to form a closure therefor.

4. In a device of the class described, a housing, said housing including a chamber, a ventilating stack on said housing communicating with said chamber, an entrance tunnel communicating with said chamber, an exit tunnel communicating with said chamber, a conveyor mechanism in said chamber, said conveyor mechanism including a pair of spaced chains, said chains being supported on two sets of spaced sprockets, means to drive one set of said sprockets, a conveyor mechanism in said entrance tunnel and a conveyor mechanism in said exit tunnel, each of said last two conveyor mechanisms including a frame, said frame being pivotally supported adjacent its outer end and including a bottom and side walls, a plurality of rollers rotatably supported on said frame and a plurality of transverse partitions on said frame, said partitions being positioned between said rollers, a supporting member adjacent the inner end of said frame, means to raise or lower said supporting member whereby said frame may be moved about its pivotal support, a screen in said chamber below said conveyor mechanism therein, said chamber including a liquid receptacle, a plurality of spray devices in said chamber, means to conduct said liquid from said chamber to said spray devices, a pump, means to operate said pump, said pump being adapted on operation thereof to draw said liquid from said chamber and force it to said spray devices, means to conduct fluid to said spray devices, said fluid being adapted to draw said liquid from said chamber to said spray devices and force it therefrom and means whereby either said pump or said fluid may be used to operate said spray devices, a valve associated with said liquid conduit and a valve associated with said fluid conduit, means to normally retain said valves in a closed position, means operable by an article on said conveyor in said chamber to actuate said valves to an open position to thereby cause said spray devices to operate to spray said article, said article when in said entrance tunnel being adapted to form a closure therefor and when in said exit tunnel being adapted to form a closure therefor.

5. In a box spraying device a housing having an entrance tunnel, an exit tunnel and a spraying chamber, said entrance tunnel including side walls and a top wall, a conveyor in the bottom of said entrance tunnel, said conveyor including a frame having conveying means thereon, said frame having transverse partitions extending thereacross.

6. In a box treating device, a housing including an entrance tunnel, an exit tunnel with a treating chamber therebetween, means to convey boxes through said entrance tunnel into said treating chamber and then out of said exit tunnel, said means including horizontal conveyors upon the upper surfaces of which the boxes proceed and means to cause the ends of said boxes to be spaced when in said treating chamber.

7. In a box treating device, a housing including an entrance tunnel, an exit tunnel with a treating chamber therebetween, a conveyor in said treating chamber, a second conveyor adapted to deliver boxes to said entrance tunnel, means to convey boxes from said second conveyor through said tunnel to said first conveyor, means to convey boxes from said first conveyor through said exit tunnel and means to drive said first conveyor at a faster linear speed than the linear speed of said second conveyor.

8. In a citrus box treating device, a housing including an entrance tunnel, an exit tunnel with a treating chamber therebetween, said entrance tunnel and said exit tunnel being of a size to be substantially sealed when boxes are passing therethrough, means to direct gaseous material detrimental to destructive organisms into the box to cause such material to pass into and through the cracks of said box and means to convey boxes to and from said treating chamber through said tunnels.

9. In a device of the class described, a housing, said housing including a chamber, an entrance tunnel communicating with said chamber and an exit tunnel communicating with said chamber, a power conveyor in said chamber, a roller conveyor in each of said tunnels, a second power conveyor adapted to convey articles to the roller conveyor in the entrance tunnel and a third power conveyor adapted to convey articles away from the roller conveyor in said exit tunnel.

10. In a device of the class described, a housing, said housing including a chamber, an entrance tunnel communicating with said chamber, an exit tunnel communicating with said chamber, a power conveyor mechanism in said chamber, a conveyor means in said entrance tunnel and a conveyor means in said exit tunnel, power operated means to deliver articles to said entrance tunnel conveyor means, power operated means to convey articles from said exit tunnel conveyor means, said chamber and said tunnels being of a length whereby, in operation of the device one article will simultaneously be in said entrance, another on said power operated conveyor and another in said exit tunnel.

11. In a device of the class described, a housing, said housing including a chamber, an opening communicating with said chamber, a conveyor mechanism in said opening, said conveyor mechanism including a frame, said frame being pivotally supported, a plurality of rollers rotatably supported on said frame and adjustable means to support one end of said frame.

12. In a device for sterilizing articles, a housing, said housing including a chamber, an entrance tunnel communicating with said chamber and an exit tunnel communicating with said chamber, a power conveyor in said chamber, a spray device in said chamber, means to operate said spray device, a receptacle associated with said chamber, said exit tunnel having a sloping bottom draining into said receptacle, the article when in said entrance tunnel being adapted to form a closure to the entrance of said chamber and when in said exit tunnel being adapted to form a closure from said chamber to said exit tunnel.

In testimony whereof, I hereunto affix my signature.

CHARLES B. COOK.